US 6,678,755 B1

(12) United States Patent
Peterson et al.

(10) Patent No.: US 6,678,755 B1
(45) Date of Patent: Jan. 13, 2004

(54) METHOD AND APPARATUS FOR APPENDING MEMORY COMMANDS DURING A DIRECT MEMORY ACCESS OPERATION

(75) Inventors: James R. Peterson, Portland, OR (US); Aaftab Munshi, Los Gatos, CA (US); Mohammed Sriti, Beaverton, OR (US)

(73) Assignee: Micron Technology, Inc., Boise, ID (US)

( * ) Notice: Subject to any disclaimer, the term of this patent is extended or adjusted under 35 U.S.C. 154(b) by 599 days.

(21) Appl. No.: 09/608,544

(22) Filed: Jun. 30, 2000

(51) Int. Cl.[7] ............................................. G06F 13/14
(52) U.S. Cl. ............................ 710/24; 710/22; 710/26; 710/52; 710/240
(58) Field of Search ........................... 710/22, 24, 26, 710/52, 240

(56) References Cited

U.S. PATENT DOCUMENTS

| | | | | |
|---|---|---|---|---|
| 5,717,952 A | * | 2/1998 | Christiansen et al. ....... 395/364 |
| 5,862,407 A | * | 1/1999 | Sriti ........................... 385/843 |
| 5,928,339 A | * | 7/1999 | Nishikawa ................... 710/26 |
| 6,108,743 A | * | 8/2000 | Debs et al. ................. 710/240 |
| 6,112,259 A | * | 8/2000 | Marsanne et al. ............ 710/22 |
| 6,363,438 B1 | * | 3/2002 | Williams et al. .............. 710/22 |
| 6,584,518 B1 | * | 6/2003 | Bass et al. ..................... 710/52 |

* cited by examiner

Primary Examiner—Abdelmoniem Elamin
(74) Attorney, Agent, or Firm—Dorsey & Whitney LLP

(57) ABSTRACT

A direct memory access (DMA) controller for controlling memory access operations in a memory. During a memory access operation, the DMA controller executes a chain of DMA commands stored in a memory and having a respective address. The DMA controller can enter a self-linking mode where additional DMA commands can be appended to the end of the command chain without terminating the memory access operation, regardless of whether the last DMA command of the command chain has been executed by the DMA controller. The self-linking mode is entered when a link-address provided by the last DMA command matches a code. The code to cause the DMA controller to enter the self-linking mode may be a link address which points to the last executed DMA command, or alternatively, a predetermined bit pattern. The DMA controller exits the self-linking command and continues the memory access operation upon detecting a new link address for a new DMA command that is to be appended to the command chain. The new link address may be detected by having the DMA controller periodically check the link address of the last executed DMA command.

26 Claims, 4 Drawing Sheets

METHOD AND APPARATUS FOR APPENDING MEMORY COMMANDS DURING A DIRECT MEMORY ACCESS OPERATION

TECHNICAL FIELD

The present invention relates generally to direct memory access (DMA) operations in a computer system, and more particularly, to appending additional DMA commands to a DMA command chain without terminating the DMA operation.

BACKGROUND OF THE INVENTION

Direct memory access (DMA) controllers are currently used to read graphics data, such as texture information, pixel information, and depth information, from system memory and write the graphics data to a graphics memory. The DMA controller operates according to DMA commands, which are normally processed in a pipeline fashion. That is, DMA commands are placed in a queue or command chain and sequentially executed by the DMA controller.

Typically, the last DMA command in the chain instructs the DMA controller to terminate the DMA operation. Additional DMA commands may be added to the chain of commands after the DMA controller has begun to sequentially execute the original commands. The chain is extended by removing the last command of the original chain of DMA commands, that is the command terminating the DMA operation, and appending new DMA commands. However, the appended commands must be added to the queue before the terminate command at the end of the original chain has been reached. Consequently, the processor must query the DMA controller to determine if the DMA operation has been terminated before additional DMA commands can be added to the queue.

One method that has been used to determine whether the DMA operation has been terminated is to have a system processor query the DMA controller to determine if the last DMA command in the command chain, namely, the terminate command, has been executed. Where the DMA operation has already terminated, no additional DMA commands can be appended to the chain, and a new DMA operation must be initiated by the system processor. A drawback to this method is that the system processor becomes idle as it polls the DMA controller, thus, wasting several clock cycles waiting for a response.

Another conventional method that has been used is for the DMA controller to send an interrupt to the system processor when the DMA command chain is completed. However, the interrupt sent by the DMA controller causes the system processor to perform a task switch. The system processor is forced to switch from a user mode to a kernel mode, and then back again. Both of these methods are relatively time consuming, and reduce the efficiency of the overall system.

SUMMARY OF THE INVENTION

The present invention relates to a direct memory access (DMA) controller for controlling memory access operations on a memory. The DMA controller executes DMA commands in a command chain during a memory access operation. The DMA commands are stored in a memory and have a respective address. The DMA controller can enter a self-linking mode where additional DMA commands can be appended to the end of the command chain without terminating the memory access operation, although the last DMA command of the command chain has been executed by the DMA controller. The DMA controller enters the self-linking mode when a link-address provided by the last DMA command matches a code. The code to cause the DMA controller to enter the self-linking mode may be the address of last executed DMA command, that is, a link address which points to itself. Alternatively, the code may also be a predetermined bit pattern. The DMA controller exits the self-linking command and continues the memory access operation upon detecting a new link address for a new DMA command that is to be appended to the command chain. The new link address may be detected by having the DMA controller periodically check the link address of the last executed DMA command.

DETAILED DESCRIPTION OF THE INVENTION

A method and apparatus for appending memory commands during a direct memory access (DMA) operation without terminating the DMA operation is described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention.

Figure 1:
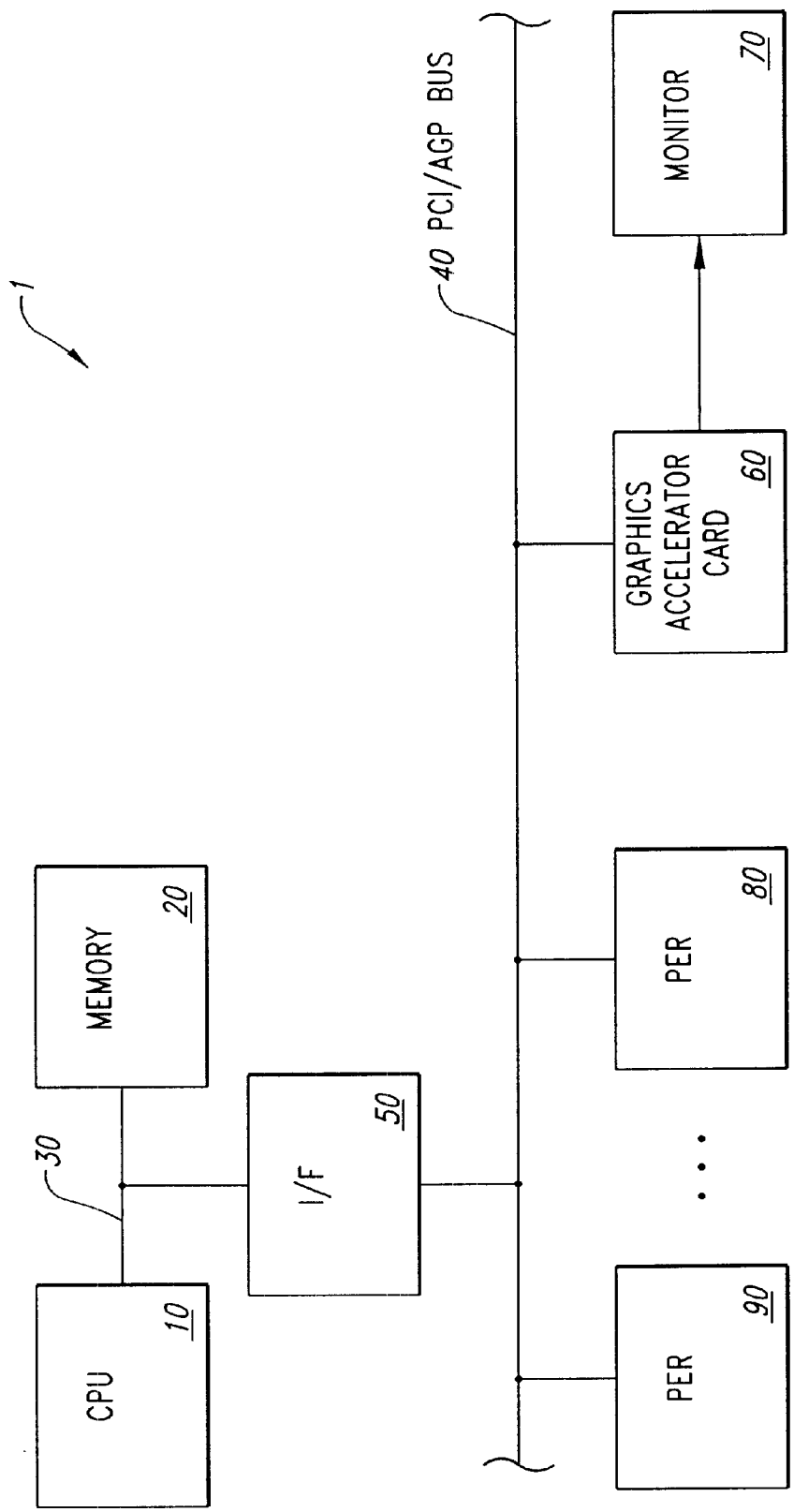
FIG. 1 is a block diagram of a computer system in which an embodiment of the present invention is implemented.

FIG. 1 illustrates a computer system 1 in which one embodiment of the present invention is implemented. The computer system includes a central processing unit (CPU) 10 coupled to a memory 20 by a system bus 30. The system bus 30 is coupled to a PCI (peripheral component interconnect) bus 40 by a bus interface 50. Coupled to the PCI bus 40 are a graphics accelerator card 60, which is coupled to a monitor 70, as well as a number of other peripheral devices 80 and 90. Optionally, the graphics accelerator card 60 may be coupled to the CPU 10 and the memory 20 through other architectures, such as through a memory/bus interface and a high speed bus (not shown), such as an accelerated graphics port (AGP), to provide the graphics accelerator card 60 with direct memory access (DMA) to the memory 20. In the embodiment illustrated in FIG. 1, the disclosed embodiment of the present invention is implemented within graphics accelerator card 60.

Figure 2:
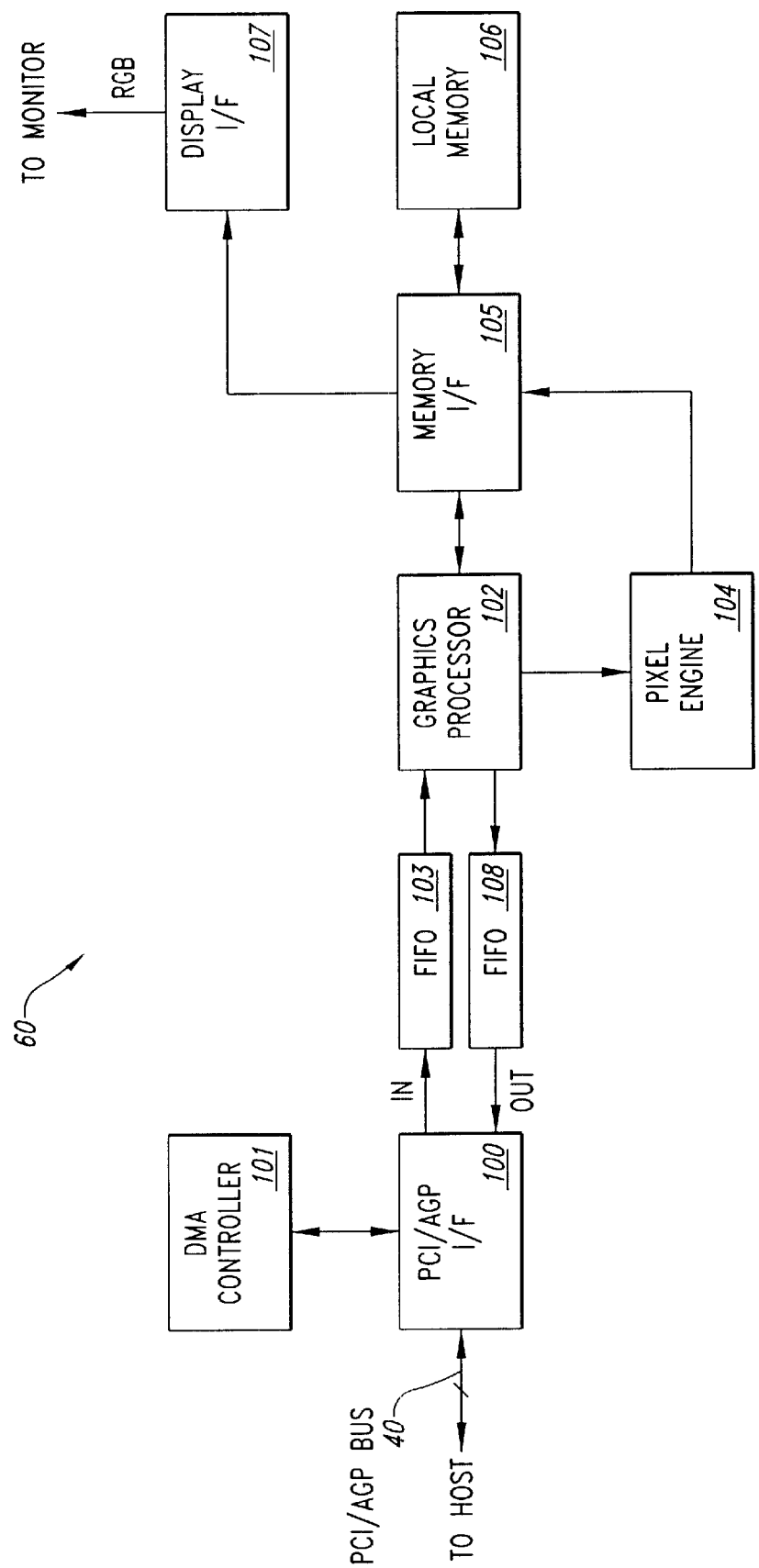
FIG. 2 is a block diagram of circuitry on a graphics accelerator card in the computer system of FIG. 1.

FIG. 2 illustrates the graphics accelerator card 60 in greater detail. The graphics accelerator card 60 includes a graphics processor 102, which is designed to control and perform various graphics functions. The graphics processor 102 is coupled to a local memory 106 through a memory interface 105 and to a pixel engine 104. The local memory 106 includes a frame buffer (not shown) for storing pixel color values that are to be displayed on the monitor 70. Color values stored in the frame buffer are provided to the monitor in the form of RGB (red, green, blue) analog signals via a display interface 107. The graphics accelerator card 60 is coupled to the PCI bus 40 by a PCI interface 100. A direct memory access (DMA) controller 101, which is coupled to the PCI interface 100, controls DMA operations performed on any memory within the computer system 1, such as main memory 20, that are required to support operation of the graphics accelerator card 60. Information received by the graphics accelerator card 60 over the PCI bus 40 is provided to the graphics processor 102 via an input FIFO 103, while information to be output onto the PCI bus 40 by the graphics processor 102 is provided to the PCI interface 100 via an output FIFO 108.

Figure 3:
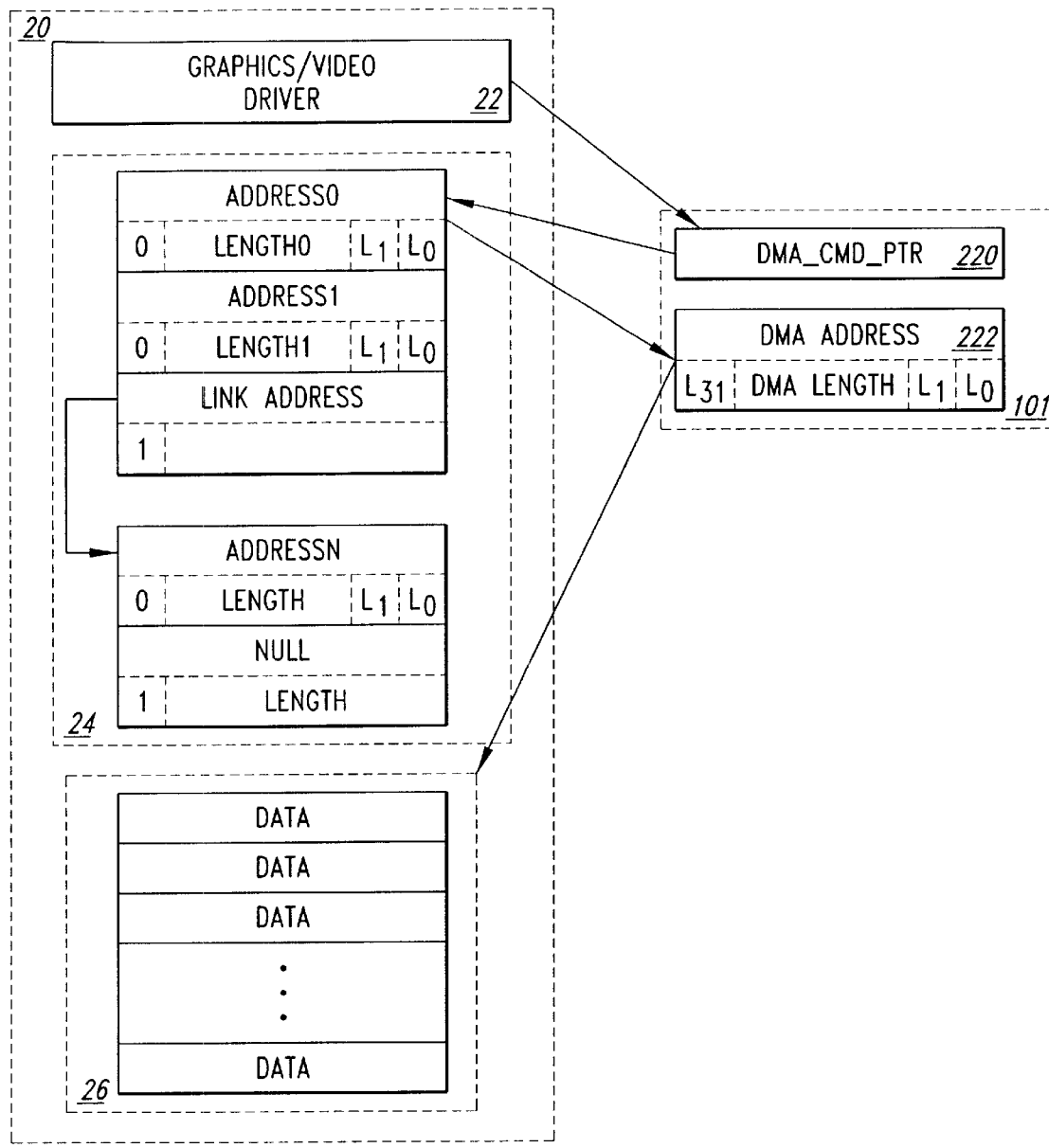
FIG. 3 is a schematic illustration of the control flow between a DMA controller and a host system during a DMA operation.
Figure 4:
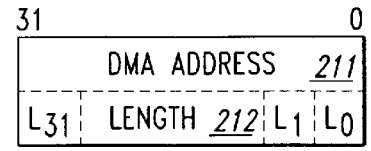
FIG. 4 is a schematic illustration of a direct memory access (DMA) command pair.

The DMA controller 101 is a PCI bus master which executes DMA operations that are specified by command pairs in a chained DMA command list. FIG. 3 illustrates an example of a chained command list 24, which is stored in the memory 20. The command list 24 is generated by graphics driver software 22 supporting the graphics accelerator card 60 and is also stored in the memory 20. Each DMA command pair consists of an Address field in the even dword and a Length field in the odd dword. FIG. 4 illustrates a DMA command pair, including Address field 211 and Length field 212. The Address field provides a word-aligned physical byte address of either: 1) the first dword of data in the data array 26 that is to be accessed for that command, or 2) the (link) address of the next DMA command to be executed. The Length field specifies the size of the DMA transfer when the Address field specifies an address in the data array 26. The most significant bit of the Length field, bit $L_{31}$, is used to indicate whether the address specifies the location of data or a link to another DMA command. Specifically, a value of 1 for bit $L_{31}$ indicates that the Address field specifies a link to another DMA command.

Data stored in the memory 20 is dword-aligned; consequently, bits $L_0$ and $L_1$ of each DMA command are not required for addressing data. As shown in FIG. 4, the two least significant bits of the Length field, bits $L_0$ and $L_1$ (where $L_0$ is the least significant bit), are used to indicate a byte swapping scheme for a memory access. For each DMA command, the values of bits $L_0$ and $L_1$ are set by the graphics driver software 22 based on the graphics requirements of whatever application software is currently running in the computer system 1. Note that bits $L_0$ and $L_1$ are ignored if bit $L_3$, is set to 1, since the Address field specifies a link to another DMA command in such cases. A more detailed description of a system for performing DMA byte swapping has been previously described in U.S. Pat. No. 5,862,407 to Sriti, issued Jan. 19, 1999, which is incorporated herein by reference.

In the embodiment of the present invention, additional DMA commands may be appended to the DMA command list without the need to query the DMA controller 101 to determine if the null command has been reached. As will be explained in greater detail below, the link address may be used to indicate to the DMA controller 101 to pause the DMA command execution until additional DMA commands are appended to the DMA command list. In one embodiment, the DMA controller 101 is commanded to pause when the link address matches the address of the most recent DMA command, that is, a self-pointing link address. In another embodiment, the DMA controller pauses when the link address matches a predetermined code. The DMA controller will subsequently periodically check the Address field of the most recent DMA command for a new address for the next DMA command to be executed. When a new value is provided by the Address field, the DMA controller 101 will proceed to execute the appended DMA commands located at the address. Alternatively, the DMA controller 101 may monitor an address bus for access to the address of the DMA command having the self-linking address, instead of periodically checking for changes in the value of the Address field.

FIG. 3 illustrates the control flow during a DMA operation. As shown in FIG. 3, the DMA controller 101 includes a DMA command pointer register 220 and a DMA command register 222. The DMA command pointer register 220 stores the physical byte address of the current DMA command pair. The DMA command register 222 holds the values of the DMA command pair currently being executed. A DMA operation is initiated by the graphics driver 22 writing the address of the first DMA command of the DMA command list to the DMA command pointer register 220. When the address of the first DMA command pair is written to the DMA command pointer register 220, the DMA controller 101 begins executing DMA commands (i.e., command pairs) in the chained DMA command list 24. A null value in the Address field terminates the DMA operation. Each time a DMA command is completed, the value in the DMA command pointer register 220 is incremented by eight bytes to correspond to the byte location of the next DMA command pair.

Figure 5:
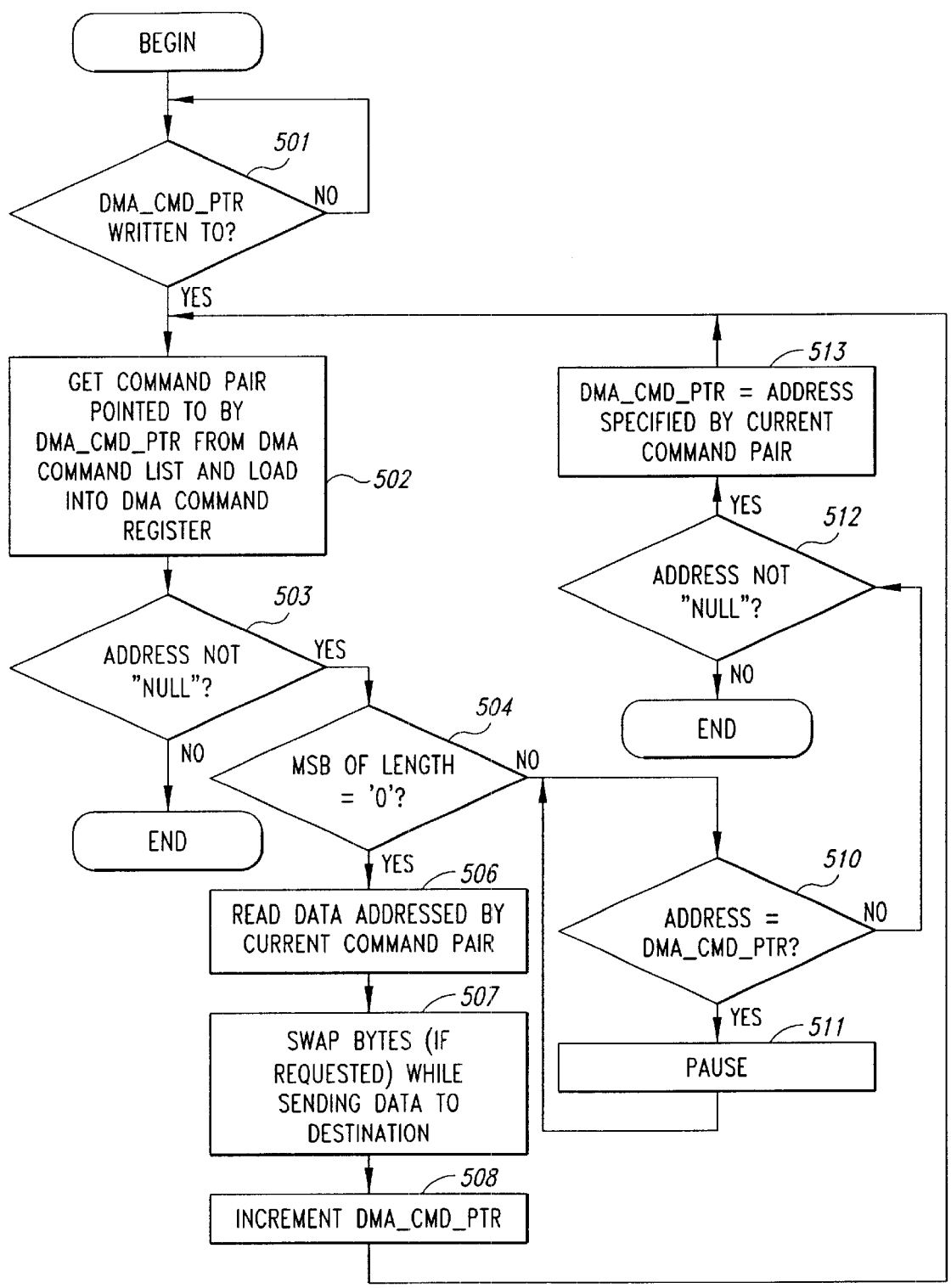
FIG. 5 is a flow diagram illustrating a technique for performing a direct memory access operation in accordance with one embodiment of the invention.

Referring now to FIG. 5, the operation of the DMA controller 101 according to one embodiment of the present invention will now be described. The DMA controller 101 first checks the DMA command pointer register 220 to determine if an address of a DMA command pair has been written to the register 220 (step 501). If an address has been written to the DMA command pointer register 220, then the DMA controller 101 gets from the command list the DMA command pair pointed to by the DMA command pointer register 220 and stores that command pair in register 222 (step 502).

A determination is then made (step 503) as to whether the value of the Address field of the current DMA command pair is null. If the value of the Address field is null, then the operation is terminated. If the value is not null, then bit $L_{31}$, of the Length field is examined (step 504). If bit $L_{31}$ is 0, that is, the Address field specifies an address in the data array 26, then the DMA controller reads the data addressed by the current DMA command (step 506) and swaps the bytes within each dword of data according to bits $L_0$ and $L_1$ of the current Length field (step 507). Byte swapping occurs as each data item (dword) is transferred from memory 20 to graphics accelerator card 60. Upon completion of the current DMA command, the DMA command pointer register 220 is incremented once again by eight bytes (step 508) in order to load the next command pair.

If bit $L_{31}$ is 1, the Address field specifies a link to the next DMA command pair. The DMA controller 101 further makes a determination whether the address provided by the Address field of the DMA command matches the value in the DMA command pointer register 220 (step 510). If there is a match, then the DMA controller 101 will enter a loop and periodically check the Address field for a new value (step 511). When the address provided by the Address field no longer points to itself, the DMA controller 101 again determines if Address field provides the null value to terminate DMA command execution (step 512). If the DMA command execution is not terminated by a null value, the DMA controller 101 replaces the value in the DMA command pointer register 220 with the new link address provided by the Address field (step 513), and replaces the contents of the DMA command register 222 with the DMA command pair retrieved from the link address (step 502).

Prior to the value of the Address field changing, the graphics driver software 22 generates new DMA commands that are written to the memory 20 starting at the address provided by the new value in the Address field. Execution of the appended chained DMA command list 24 (FIG. 3) proceeds as previously described. The last command in the appended command chain 24 may be a null value to terminate the DMA operation, or may be a self-pointing address to again cause the DMA controller 101 to wait for a new link address without terminating the DMA operation.

A new DMA command chain may be appended prior to, or during, the execution of the self-linking command in the currently executing DMA command chain. Where the value in the Address field of the self-linking command of the currently executing DMA command chain is changed before its execution begins, the command to which the new value points will be executed following the completion of the previous command chain. Where the new value in the Address field is changed after the self-linking command (i.e., the last command) in the current DMA command chain has begun to be executed, the preferred embodiment of the invention avoids the need took query the DMA controller before appending DMA commands by including in the Address field of the last command a link address pointing to itself. Therefore, when the last command in the command chain is reached, the DMA command execution does not halt, but instead simply remains in a loop, where the DMA controller periodically rereads the link address. The processor can append DMA commands when the DMA command execution is looping. As a result, the processor can append DMA commands at anytime without the need to query the DMA controller to determine the state of command execution. When new DMA commands are appended, the commands are written to an area of system memory, and the link address of the final DMA command is changed from pointing to itself to pointing to the system memory address of the first command of the command chain being appended. The last appended command contains a link address pointing to itself, thereby keeping DMA command execution in a loop.

From the foregoing, it will be appreciated that although specific embodiments of the invention have been described herein for purposes of illustration, various modifications may be made without deviating from the spirit and scope of the invention. For example, although the embodiments of the present invention were described with respect to application in a graphics accelerator card, it will be appreciated that some or all of the principles described herein may be applied in other settings where direct memory access is employed. Accordingly, the invention is not limited except as by the appended claims.

What is claimed is:

1. A direct memory access (DMA) controller for executing a command chain of DMA commands during a memory access operation, each DMA command stored in a memory and having an address field in which an address value is stored, the DMA controller comprising a command register coupled to the memory to receive a last DMA command of the command chain, the command register entering a self-linking mode without terminating the memory access operation in response to receiving from the last DMA command an address value matching a code, and the command register exiting the self-linking mode in response to receiving from the last DMA command a new address value for a new DMA command to be appended to the command chain.

2. The DMA controller of claim 1, further comprising a command pointer register to store the address of a DMA command of the command chain currently being executed.

3. The DMA controller of claim 2 wherein the code comprises the address of the DMA command currently being executed.

4. The DMA controller of claim 1 wherein the code comprises a predetermined bit pattern.

5. A direct memory access (DMA) controller for controlling memory access operations to a memory, the DMA controller comprising:
   a command pointer register to store addresses of DMA commands stored in memory, the DMA commands having an address field in which link address to a DMA command is stored; and
   a command register coupled to the command pointer register and the memory to load from memory the DMA command located at the address stored in the command pointer register, the command register configured to pause from loading new DMA commands from memory in response to the link address of the DMA command matching a code, and further configured to continue loading new DMA commands in response to detecting a new link address.

6. The DMA controller of claim 5 wherein the code comprises a predetermined bit sequence.

7. The DMA controller of claim 5 wherein the code comprises the command address currently stored in the command pointer register.

8. The DMA controller of claim 5 wherein the DMA command includes a second field having a flag indicative of when the first field provides a link address.

9. The DMA controller of claim 5 wherein the command register is configured to cease memory access operations to the memory in response to the first field of the DMA command providing a null value.

10. A computer graphics system for a computer system having a system processor, a system memory, and a system bus coupled therebetween, the computer graphics system comprising:
    a processor to process graphics data;
    a local memory coupled to the processor to store the graphics data;
    a bus interface coupled to the processor and to the system bus to control the transfer graphics data to and from the computer graphics system; and
    a direct memory access (DMA) controller coupled to the bus interface to control memory access operations to the system memory, the DMA controller comprising:
       a command pointer register to store addresses of DMA commands stored in system memory, the DMA commands having an address field in which a link address to a DMA command is stored; and
       a command register coupled to the command pointer register to load from the system memory the DMA command located at the address stored in the command pointer register, the DMA controller configured to enter a self-linking mode without terminating the DMA operation in response to the address field of the DMA command storing a link address matching a code, and exiting the self-linking mode in response to the address field of the DMA command storing a new value.

11. The computer graphics system of claim 10 wherein the code comprises a predetermined bit sequence.

12. The computer graphics system of claim 10 wherein the code comprises the command address currently stored in the command pointer register.

13. The computer graphics system of claim 10 wherein the DMA command includes a second field having a flag indicative of when the first field provides a link address.

14. The computer graphics system of claim 10 wherein the DMA controller is further configured to cease DMA operations in response to the first field of the DMA command providing a null value.

15. A method of executing DMA commands in a DMA command chain during a DMA operation, each DMA command having an address field in which an address value is stored, the method comprising:

reading a last DMA command of the DMA command chain;

pausing, without terminating, the DMA operation in response to receiving from the last DMA command an address value matching a code; and resuming the DMA operation in response to detecting a new address value for an appended DMA command.

16. The method of claim 15, further comprising storing an address of the last DMA command, and wherein the code is the address.

17. The method of claim 15 wherein the code is a predetermined bit pattern.

18. The method of claim 15 wherein detecting a new address value comprises periodically reading the value of the link address provided by the last DMA command.

19. The method of claim 15 wherein detecting a new address value comprises monitoring an address bus for access to the address of the last DMA command.

20. The method of claim 15, further comprising terminating the DMA operation in response to receiving from the last DMA command an address value equal to a null value.

21. A method of executing DMA commands having address and length fields into a DMA command chain during a DMA operation, comprising:

storing an address for a current DMA command in the DMA command chain;

reading from memory the current DMA command found at the address; and entering a self-linking mode without terminating the DMA operation in response to the address field of the current DMA command providing a link address matching a code, and exiting the self-linking mode in response to the address field of the current DMA command providing a new value.

22. The method of claim 21 wherein the code comprises an address pointing to the current DMA command.

23. The method of claim 21 wherein the code comprises a predetermined bit pattern.

24. The method of claim 21 wherein entering the self-linking mode comprises entering a loop and periodically checking the address field for a new link address pointing to a new DMA command.

25. The method of claim 21, further comprising after exiting the self-linking mode terminating the DMA operation responsive to the new value provided by the address field of the current DMA command being a null value.

26. The method of claim 21, further comprising after exiting the self-linking mode reading a new DMA command responsive to the address field of the current DMA command providing a link address of the new DMA command.

* * * * *